United States Patent [19]
Hegler et al.

[11] Patent Number: 5,953,974
[45] Date of Patent: Sep. 21, 1999

[54] APPARATUS FOR CUTTING SLOTS IN CORRUGATED AND TWIN-WALL PIPES

[75] Inventors: Ralph-Peter Hegler, Bad Kissingen; Wilhelm Hegler, Goethestrasse 2, D-97688 Bad Kissingen, both of Germany

[73] Assignee: Wilhelm Hegler, Germany

[21] Appl. No.: 08/308,592

[22] Filed: Sep. 19, 1994

[30] Foreign Application Priority Data

Sep. 22, 1993 [DE] Germany .............................. 43 32 123

[51] Int. Cl.⁶ .............................. B26D 1/06; B26D 3/06; B26D 5/20; B26D 7/06
[52] U.S. Cl. .................................. 83/206; 83/876; 83/54; 83/212; 83/226; 83/277; 83/282; 83/452; 83/465; 83/466; 279/35; 279/106; 409/199; 409/203
[58] Field of Search .............................. 83/452, 465, 466, 83/875, 876, 54, 490, 211, 212, 226, 228, 229, 206, 409, 277, 279, 282, 278; 409/157, 158, 159, 172, 199, 203; 279/35, 106

[56] References Cited

U.S. PATENT DOCUMENTS

| | | |
|---|---|---|
| 1,050,770 | 1/1913 | Klaber et al. .............................. 279/33 |
| 2,604,017 | 7/1952 | Crafts et al. .............................. 409/199 |
| 2,638,136 | 5/1953 | Miller ...................................... 409/199 |
| 2,980,434 | 4/1961 | Hoffman .................................. 279/106 |
| 3,266,356 | 8/1966 | Seravin et al. . | 
| 3,389,431 | 6/1968 | Kelly . |
| 3,843,758 | 10/1974 | Maroschak . |
| 3,916,763 | 11/1975 | Maroschak .................................. 83/54 |
| 3,957,386 | 5/1976 | Lupke . |
| 4,000,672 | 1/1977 | Sitterer et al. .............................. 83/54 |
| 4,082,022 | 4/1978 | Horn et al. ................................ 83/212 |
| 4,488,467 | 12/1984 | Hegler et al. . |
| 4,779,651 | 10/1988 | Hegler et al. . |
| 4,930,936 | 6/1990 | Hegler et al. . |
| 5,016,429 | 5/1991 | Kubsik et al. ............................ 83/211 |

FOREIGN PATENT DOCUMENTS

| | | |
|---|---|---|
| 2306813 | 11/1976 | France ....................................... 83/54 |
| 3914779 | 11/1990 | Germany . |
| 9011516 | 11/1990 | Germany . |
| 1002510 | 3/1983 | U.S.S.R. ................................ 279/106 |

OTHER PUBLICATIONS

Unicor, Corrugators, Production lines for large–sized corrugated pipes 65.420 mm o.d., 4 pp. (Date Unknown).

*Primary Examiner*—Rinaldi I. Rada
*Assistant Examiner*—Charles Goodman
*Attorney, Agent, or Firm*—Robert F. I. Conte; Lee, Mann, Smith, McWilliams, Sweeney & Ohlson

[57] ABSTRACT

An apparatus for cutting slots in corrugated and twin-wall pipes that have annular elevations alternating with annular impressions, comprises a machine frame with a pipe duct and a lifting carriage for moving a pipe through the pipe duct. Two groups of holding and centering levers are provided which are engageable with a pipe for straightening and retaining the latter axially and radially. Further, saws are provided which are disposed between two groups of holding and centering levers on the machine frame and which are movable to reciprocate lineally and radially in relation to the axis of the pipe duct.

8 Claims, 3 Drawing Sheets

APPARATUS FOR CUTTING SLOTS IN CORRUGATED AND TWIN-WALL PIPES

BACKGROUND OF THE INVENTION

1. Field of the Invention

The invention relates to an apparatus for cutting slots in corrugated and twin-wall pipes.

2. Background Art

A device for the cutting of slots in pipes of cuttable material, in particular in plastics drain pipes, is known from U.S. Pat. No. 4,488,467. It has a cutter head, which is provided with at least one knife and which is positively driven by a planetary gear to move on rolling contact with the circumference of the pipe. The cutting edge of the knife rotates along an epitrochoid about the tube. The cutter head is provided with webs engaging with annular impressions in the external wall of the pipe. The cutter head is provided with helical webs, the at least one knife being arranged parallel to the webs. As a result, holes can be cut into pipes that have at least in part toroidal elevations and corresponding impressions along their circumference. These devices have been very successful in practice; their disadvantage resides in that, for pipes of great diameters, they become too complicated in construction.

A leaflet of UNICOR GmbH entitled "CORRUGATORS Production lines for large-sized corrugated pipes 65–420 mm o.d.", imprint 104/02/97/10.89/EA, discloses to use saws for the production of slots in the mentioned corrugated and twin-wall pipes. Six saws at maximum are applicable around the tube, which are pivoted about a frame axis in the direction towards and away from, the pipe. The pipe is retained during the sawing operation in the direction of its axis.

SUMMARY OF THE INVENTION

It is an object of the invention to embody an apparatus of the type mentioned at the outset such that the pipe to be provided with slots is exactly retained axially and radially.

According to the invention, this object is solved by the features comprising a machine frame with a pipe duct for a pipe, the pipe duct having a central longitudinal axis, a convenying carriage drivable by means of a conveying drive in the direction of the axis for a pipe to be moved through the pipe duct in the direction of production, two groups of holding and centering levers, the groups —referred to the direction of production —being spaced from each other on the frame and mounted to be pivotable from a position of engagement with the annular impressions to a position of release of the pipe, and the holding and centering levers of each group enclosing the pipe duct by more than 180°, a group of conveying levers mounted on the lifting carriage to be pivotable from a position of engagement with the annular impressions to a position of release of the pipe, these conveying levers enclosing the pipe duct by more than 180°, pivoting drives each provided for the driving of a group of levers, saws disposed on the machine frame between the two groups of holding and centering levers and movable towards and away from, the pipe duct. By reason of the measures according to the invention, the pipe is exactly and tightly retained axially and radially to its axis on either side of the portions to which the saws are set so that the cut can be made with high accuracy.

The embodiment according to which the saws are disposed on carriages displaceable lineally towards and away from, the pipe duct, ensures that the slots always have the same position on the pipe, and that regardless of whether pipes of great diameters or pipes of small diameters are provided with slots. These measures are applicable also in the case of a different kind of axial and radial retaining and centering of the pipe; on the other hand, the measures according to the invention are also applicable when the saws are not set radially to the axis of the tube. But in common application, the afore-mentioned measures are particularly advantageous. The term "sawing" used in this application also means milling, for instance by disk milling cutters.

Details of the invention will become apparent from the ensuing description of an example of embodiment taken in conjunction with the drawing.

DESCRIPTION OF THE PREFERRED EMBODIMENT

Figure 1:
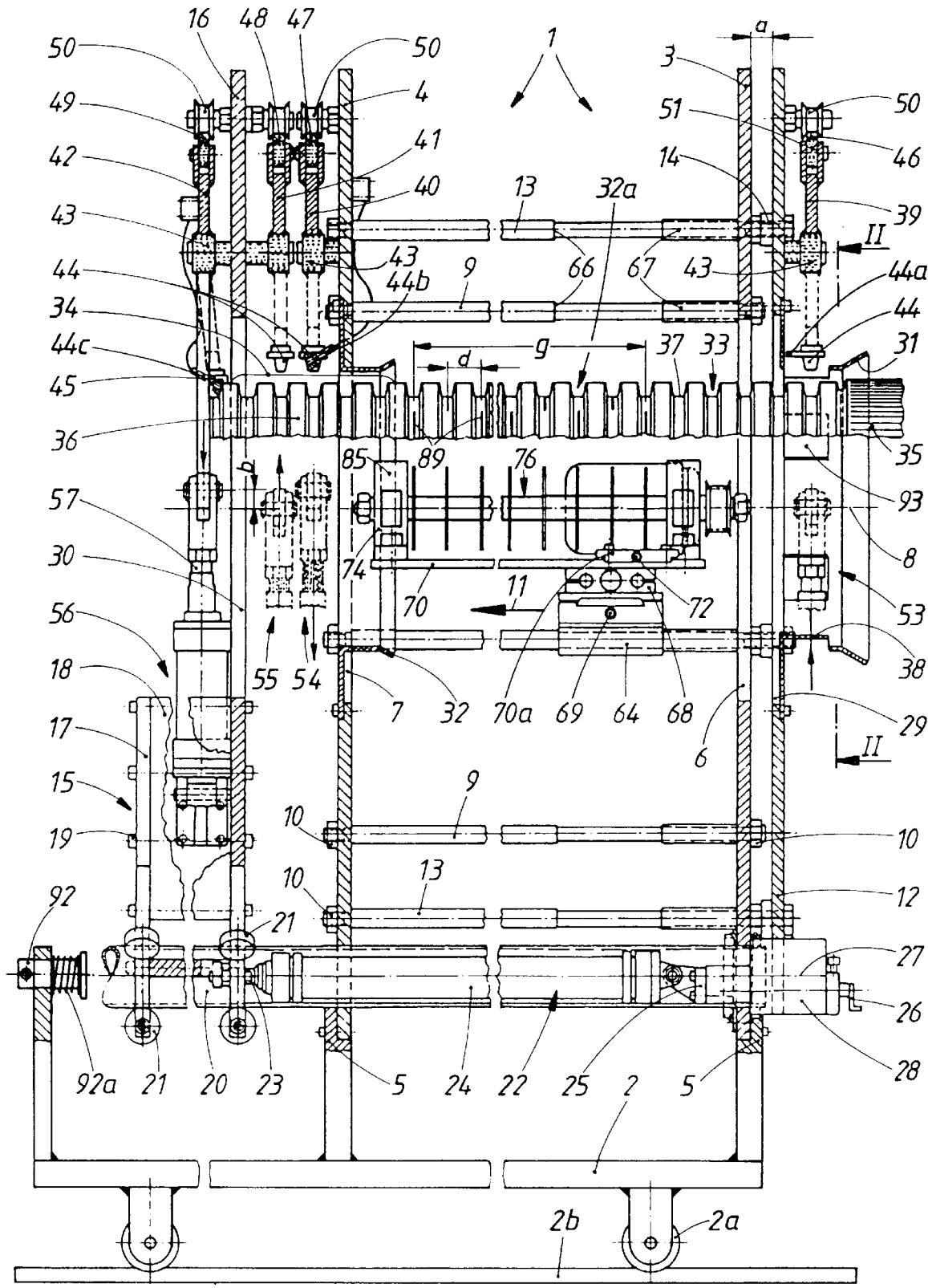
FIG. 1 is a vertical longitudinal section through an apparatus for the cutting of slots in corrugated and twin-wall pipes with an integrally molded socket in an illustration according to the line I—I of FIG. 2.

The apparatus shown in the drawing for the cutting of slots in corrugated and twin-wall pipes with an integrally molded plastics socket has a stationary machine frame 1 fixed on a machine table 2. The machine table 2 is supported on rails 2b by way of rollers 2a. The machine frame 1 substantially consists of two frame plates 3, 4 of vertical arrangement, which are parallel to each other and spaced apart from each other; the frame plates 3, 4 and the machine table 2 are screwed together by means of angle brackets 5. The frame plates 3, 4 each have a circular opening 6, 7, the openings 6, 7 being in alignment with each other and defining a central longitudinal axis 8 of the apparatus.

The frame plates 3, 4 are interconnected by means of a plurality of internal connecting rods 9 disposed at equal angular distances relative to each other, the connecting rods 9 and the frame plates 3 and 4 being screwed together by means of nuts 10. These internal connecting rods 9 each have the same distance from the axis 8 and extend parallel to the latter. Thus, the frame plates 3 and 4 and the connecting rods 9 with the nuts 10 substantially form the machine frame 1.

Seen in the direction of production 11, a supporting plate 12 similar to the frame plate 3 precedes the frame plate 3 shown on the right in FIG. 1. The supporting plate 12 is connected with the further frame plate 4—shown on the left in FIG. 1—by means of external connecting rods 13, the screwed connection likewise being effected by means of nuts 10. The external connecting rods 13 pass through the frame plate 3, i.e. there is no screwed connection. The distance a between the supporting plate 12 and the adjacent frame plate 3 can be adjusted by interchangeable spacers 14.

On the downstream side of the frame 1 seen in the direction of production 11, a conveying carriage 15 is arranged, comprising a supporting plate 16 similar to the supporting plate 12 and to the frame plates 3, 4. The supporting plate 16 and a carriage wall 17 spaced out in the direction of production 11, and a distance plate 18 disposed between the carriage wall 17 and the supporting plate 16 and spacing same apart in the direction of production 11, and fasteners 19, for instance screws, joining the supporting plate 16, the carriage wall 17 and the distance plate 18, altogether substantially form the conveying carriage 15. The latter is guided for displacement in the direction of production 11 on two horizontal guideways 20 for instance formed by precision steel tubes located in the machine frame 1 parallel to the axis 8. For the purpose of guidance free from play, rollers 21 disposed at equal angular distances and bearing against the tubular guideway 20 from outside are located three by three in the vicinity of the supporting plate 16 and in the vicinity of the carriage wall 17, for free rotation in the lifting carriage 15. As seen in FIG. 1, the lifting carriage is foreshortened. Its actual length in the direction of production 11 is such as to ensure the displacement free from tilting, of the supporting plate 16.

The conveying carriage 15 is driven by means of a conveying drive 22 in the form of a linear drive , a pressure medium actuatable piston cylinder drive in the concrete case. The piston rod 23 of the conveying drive 22 is fixed to the lifting carriage 15. The opposite end of the cylinder 24 of the conveying drive 22 is fixed to an abutment 25 displaceable in the direction of production in relation to the frame plate 3. By way of a spindle 27 rotatable by a crank 26, the abutment 25 in the form of a spindle nut is supported on a spindle bearing 28 mounted on the frame plate 3. By rotation of the crank 26 and thus of the spindle 27, the abutment 25 and thus the cylinder 24 of the lifting drive 22 is adjusted in relation to the frame 1 in the direction of production 11 or in a direction opposite to the direction of production 11.

The supporting plates 12, 16 likewise have openings 29, 30 lapping the openings 6, 7. Concentrically of the axis 8, funnel-shaped pipe guiding sockets 31, 32 are screwed on the supporting plate 12 leading in the direction of production 11 and on the frame plate 4 turned away from the latter. The openings 6, 7, 29, 30 and the pipe guiding sockets 31, 32 define a pipe duct 32a that extends concentrically of the central longitudinal axis 8.

In the direction of production 11 a pipe 33 is insertable through the pipe guiding sockets 31, 32 into the pipe duct 32a, the spigot 34 of the pipe 33 leading for insertion in the direction of production 11. A socket 35 is integrally molded on the rear end of the pipe 33 in the direction of production 11. The pipe 33 consists of plastics and is formed as a corrugated pipe, i.e. it comprises annular elevations 36 alternating with annular impressions 37 located between two such elevations 36. The pipe 33 can be a so-called plain corrugated pipe or also a twin-wall pipe which, in addition to the external corrugated pipe, has a smooth cylindrical internal pipe that is connected with the external pipe in the vicinity of the annular impressions 37 inside the pipe. Such plain corrugated pipes or corrugated twin-wall pipes are generally known and commercial. Corrugated twin-wall pipes are for instance known from U.S. Pat. 4,930,936, from which it is equally known to mold a socket 35 in one piece with such pipes 33.

The guiding socket 31 mounted on the support plate 12 has an internal guide face 38, of which the inside diameter slightly exceeds the outside diameter of the socket 35 of a tube 33, for the cutting of which the apparatus is set. The pipe-guiding sockets 31, 32 are exchanged when the apparatus is switched to another pipe diameter.

A plurality of holding and centering levers 39, 40—six in the present case—arranged at equal angular distances rela-tive to each other are disposed on the support plate 12 and on the frame plate 4 turned away from the latter. In like arrangement, holding and centering and conveying levers 41 are disposed on the support plate 16 of the lifting carriage 15 on the side facing the adjacent frame plate 4. Stop levers 42, again of like arrangement, are disposed on the rear side, seen in the direction of production 11, of the support plate 16 of the conveying carriage 15. All the levers 39, 40, 41, 42 are double-armed levers which, in a central portion, are pivotably supported on the supporting plate 12, the frame plate 4 and the supporting plate 16, respectively, by means of a pivot bearing 43, and that in a plane normal to the axis 8. At their inner ends facing the axis 8, the levers 39, 40, 41 have clamping segments 44 suited to the cross-sectional area of the annular impressions 37 of the pipe 33 and able to engage with the latter. The stop levers 42 are provided with stop segments 45 of similar form. The segments 44, 45 are interchangeably mounted on the levers 39 to 42. In addition to the respective clamping segment 44, a clamping element 44a projecting towards the supporting plate 12 is mounted on the holding and centering levers 39 disposed on the supporting plate 12 and bears against the external rim of the socket 35 when the pipe 33 has been pushed through the apparatus to such an extent that referred to the axis 8, the face—not shown—of the socket 35 is located between the clamping segments 44 of the holding and centering levers 39 and the supporting plate 12. Further, an optical sensor 44b is attached to a clamping segment 44 of a holding and centering lever 40, the optical sensor 44b detecting whether the mentioned clamping segment 44 is in an annular impression 37 of the pipe 33. Further, an optical sensor 44c of the same type is provided on a stop segment 45 of a stop lever 42, detecting whether the stop segment 45 is in the position of an impression 37 of the pipe 33. These optical sensors 44b and 44c are connected with a control unit not shown. They pass a signal to the control unit, which means that the annular impressions 37 of the pipe 33 have taken their correct axial and radial position referred to the axis 8.

Figure 2:
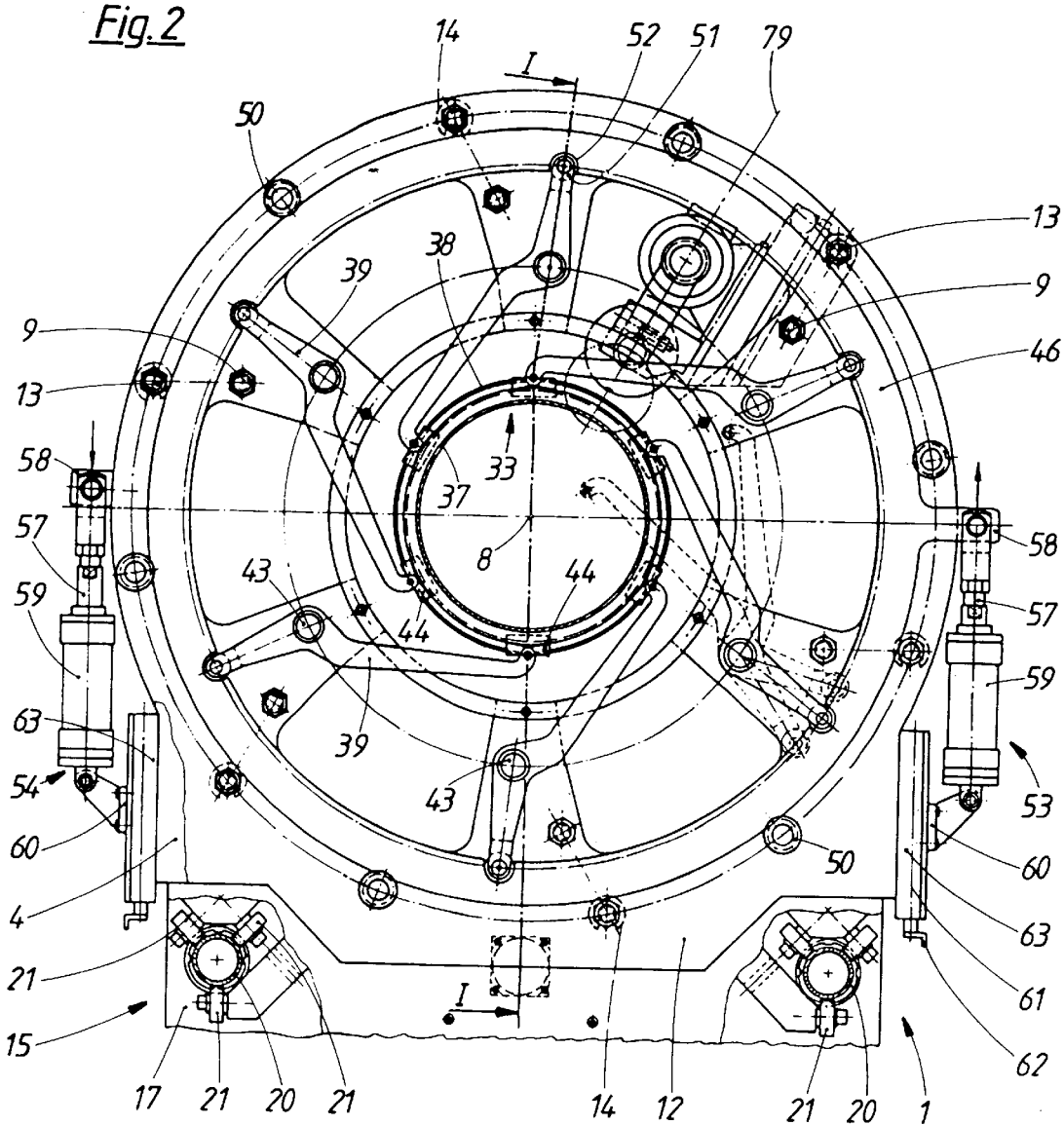
FIG. 2 is a plan view of the apparatus in a partial sectional illustration according to the line II—II of FIG. 1.
Figure 5:
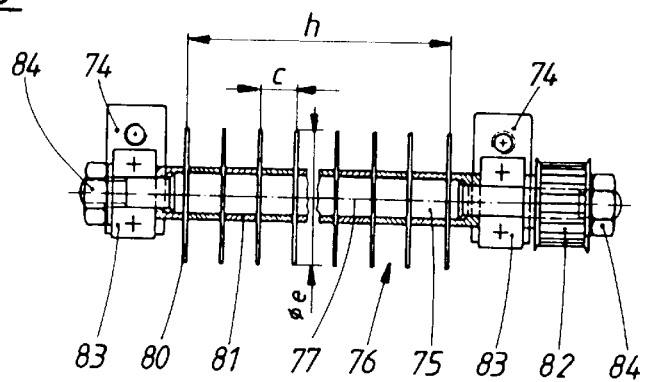
FIG. 5 is a partial illustration of the saw on an enlarged scale as referred to FIG. 4.

For the purpose of pivoting the levers 39, 40, 41, 42 respectively positioned on a plate 12, 4, 6, a pivoting drive ring 46, 47, 48, 49, which is located in guide rollers 50 supported on the respective plate 12, 4, 16, is mounted on the respective plate 12, 4, 16. The guide rollers 50 enclose the outside of the respective ring 46 to 49 so that it can be rotated or pivoted about the axis 8. On their outer ends, the levers 39 to 42 each have a pivoting roller 51 engaging with a recess 52 in the respective ring 46 to 49 so that when the respective ring 46 to 49 is pivoted about the axis 8, the associated levers 39 to 42 are pivoted about the respective pivot bearing 43, whereby the segments 44 and 45, respectively, change in distance relative to the axis 8. The extreme positions, i.e. the position closest to the axis 8 and the position the most remote from the axis 8, of the segments 44 and 45 is shown in a dashed line on the right in FIG. 2.

Pivoting drives 53, 54, 55, 56 in the form of linear drives are provided for pivoting the pivoting drive rings 46 to 49. They are pressure medium actuatable piston cylinder drives of which the piston rod 57 is articulated on bearing levers 58 projecting outwards radially to the axis 8, of the rings 46 to 49. The cylinders 59 of the pivoting drives 53 to 56 are each articulated on carriage-type abutments 60 in the form of a spindle nut, which are disposed on a spindle bearing 63 serving as a guide to be displaceable and consequently adjustable by means of a spindle 61 with a crank handle 62. The stroke b shown on the left in FIG. 1, of a pivoting drive 53 to 56 for pivoting a segment 44, 45 into a position of engagement with the corresponding impression 37 of the pipe 33 and out of it into a position of release from the pipe 33 is dimensioned such that the two mentioned positions are attained. Adjustment of the basic position of the segments 44 to the respective diameter of the pipe 33 takes place by displacing the abutment 60 by means of the spindle 61 on the spindle bearing 63.

A saw support 64 is disposed on each of an internal connecting rod 9 and an external connecting rod 13 which are assigned to each other in pairs. It has two fastening holes 65 parallel to each other, through which the connecting rods 9 and 13 are passed, one side of the saw support 64 bearing against stop collars 66 on the connecting rods 9 and 13. Distance sleeves 67 are provided on the other side, bearing against the frame plate 3.

Figure 3:
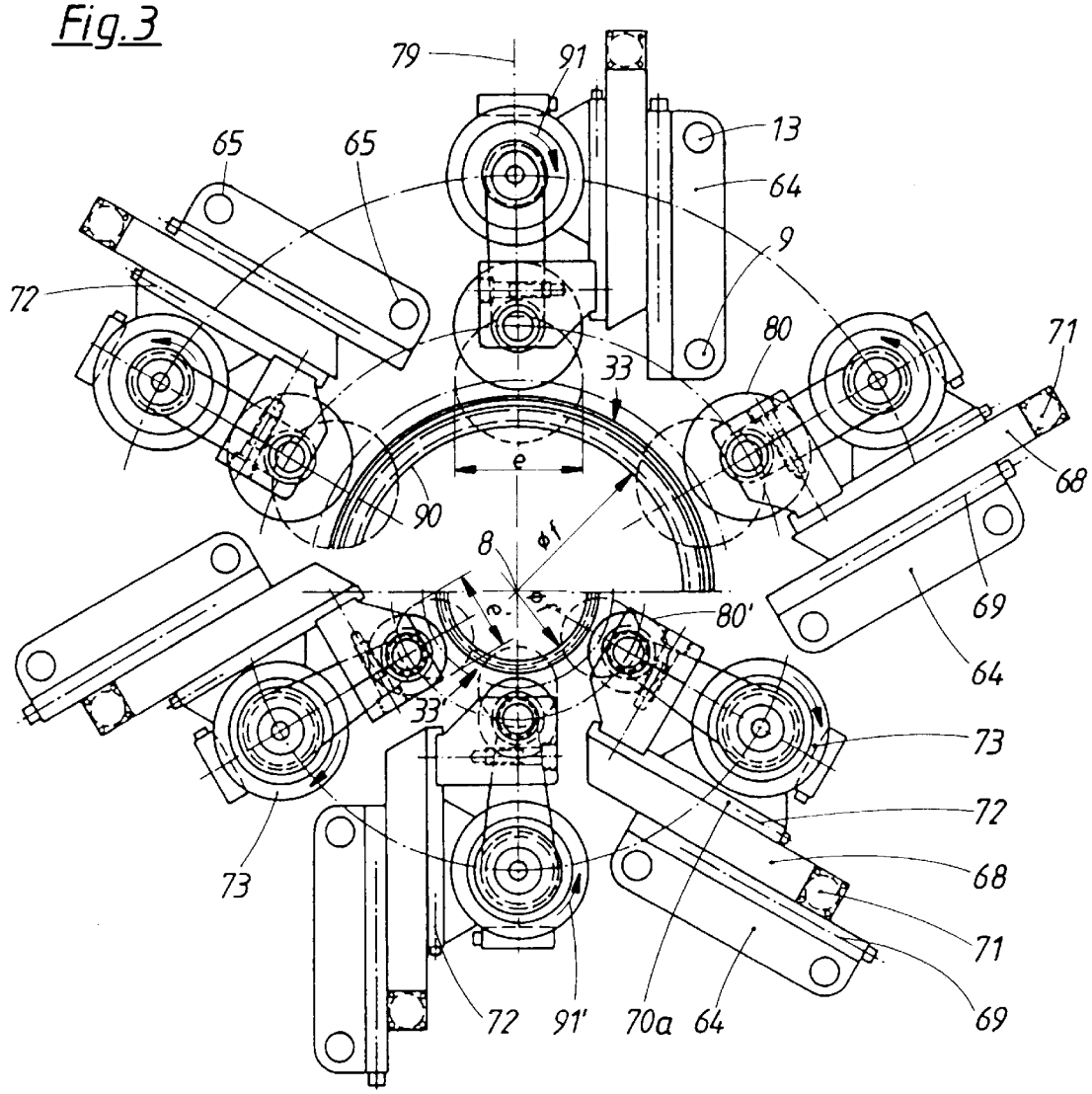
FIG. 3 is a diagrammatic illustration of the apparatus according to a cross-section through FIG. 1.
Figure 4:
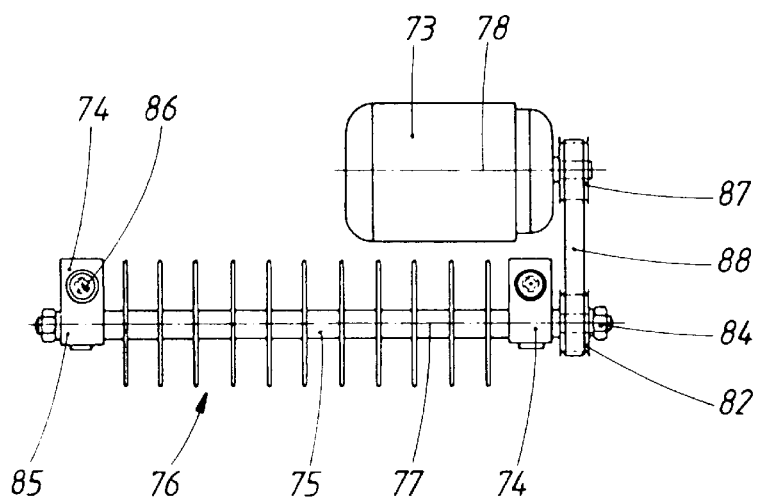
FIG. 4 is a plan view of a saw.

A carriage guide 68 is disposed for linear displacement on the saw carrier 64; it is displaceable by means of a spindle 69, and that between an adjacent and a distant and any desired intermediate position referred to the axis 8. The distant position is shown in FIG. 3, top, whereas the adjacent extreme position is shown in FIG. 3, bottom. A carriage 70a supporting a mounting plate 70 is displaceably guided on this carriage guide 68 and is drivable by means of a positioning motor 71, for instance a stepping motor. A saw driving motor 73, again displaceable for a short adjusting path by means of a spindle 72, is disposed on the carriage 70a. Further, bearing brackets 74 for a shaft 75 of a saw 76 are arranged on this carriage 70a. These bearing brackets 74 are not adjustable in relation to the carriage 70a. The axis 77 of the shaft 75 and the axis 78 of the saw driving motor 73 rest in a radial plane 79 common with the axis 8 and extend in parallel to the latter. The displacement of the carriage 70a by means of the positioning motor 71 as well as the adjusting motions by means of the spindles 69, 72 take place parallel to this radial plane 79.

Circular saw blades 80 are fixed on the shaft 75, which are disposed at a distance c relative to each other by means of distance sleeves 81, the distance c being identical with the spacing d of the annular elevations 36 and the annular impressions 37, respectively, of the pipe 33.

A pulley 82 is disposed on the shaft 75 at an end corresponding to the position of the driving motor 73. Moreover, two bearings 83 are arranged on the shaft 75. The saw 76 is mounted by the mentioned components being clamped together on the shaft 75 by means of threaded nuts 84. The bearing covers 85 being removed, the two bearings 83 are then placed into the bearing brackets 74 and then the bearing covers 85 are fixed each by means of a screw 86. So, the replacement of a saw 76 takes place very rapidly.

Likewise, the driving motor 73 is provided with a pulley 87. A belt 88 is swung around the two pulleys 82, 87. The spindle 72 for adjusting the driving motor 73 solely serves to tighten the belt 88. The stroke of this spindle 72 can be comparatively small. The pulleys 82 and 87 have a transmission ratio of 1:1, however deviations are possible. As illustrated in FIG. 3, upper half, the transmission ratio is 1:1 when circular saw blades 80 of a comparatively great diameter e are used. As seen in FIG. 3, lower half, the transmission ratio of the pulleys 82 and 87 is approximately 2:1 when circular saw blades 80' of a comparatively small diameter e' are used. In this way the peripheral velocity of the circular saw blades 80, 80' can be kept constant, given an identical speed of the saw driving motor 73. Circular saw blades 80 of a comparatively great diameter e are used for producing slots 89 in the annular impressions 37 of the pipe 33, when the latter has a comparatively great diameter f, as shown in FIG. 3, top. When, however, the pipe 33' has a comparatively small diameter f', circular saw blades 80' of smaller diameter e' are used.

The operation of the apparatus is as follows, reference being made to one pipe 33 only.

The piston rods 57 of the pivoting drives 53 to 55 are retracted into the corresponding cylinder 59, i.e. the levers 39 to 41 are pivoted such that the clamping segments 44 are in an outer position free from a pipe 33. The piston rod 57 of the pivoting drive 56 is extracted from its cylinder 59 so that the stop lever 42 is in a position in which its stop segment 45 has taken its radially inner position—referred to the axis 8. The piston rod 23 of the lifting drive 22 is moved into the cylinder 24 so that the lifting carriage 15 is in its position next to the adjacent frame plate 4.

Now a pipe 33, with its spigot 34 ahead, is pushed through the pipe guiding socket 31 and then through the pipe guiding socket 32 in the direction of production 11 until the first annular elevation 36 of the pipe 33 comes to bear against the stop segments 45 of the stop levers 42. This is where the pushing motion is being stopped. The pipe 33 has taken its position referred to the direction of the axis 8. A signal of the sensor 44c confirms the correct axial and radial initial position of the pipe 33, enabling the subsequent operations. Then the pivoting drives 53, 54, 55 are actuated for their piston rods 57 to exit so that the holding and centering levers 39, 40 and the holding and centering and conveying levers 41 are pivoted such that their clamping segments 44 mesh with the annular impressions 37 assigned to them, of the pipe 33. Now the pipe 33, with its axis coinciding with the axis 8, is arrested axially and tangentially and centered in relation to this axis 8, i.e. it cannot escape radially to the axis 8 nor in the direction of the axis 8, nor can it rotate about the axis 8. The optical sensor or sensors 44b signal that the clamping segments 44 have taken the correct position referred to the pipe 33, i.e. that the annular impressions 37 of the pipe 33 are in the correct position relative to the circular saw blades 80 and 80', respectively.

Now all the positioning motors 71 of all the saws 76 are put in operation so that the carriages 70a with the permanently operating saw driving motors 73 and the saws 76 driven by the latter are transported in rapid motion as far as to the point of penetration into the associated annular impressions 37 of the pipe 33. Right before the circular saw blades 80 reach the pipe wall 90 in the vicinity of the annular impressions 37, slow saw advance is switched to and a slot 89 is cut by each saw blade 80 into the pipe wall 90 assigned to an impression 37. Once the desired circumferential length of the slots 89 is realized as a result of the preset depth of penetration of the saw blades 80 into the pipe wall 90, the positioning motors 71 are reversed and the carriages 70a with the saws 76 and the driving motors 73 are returned to the outer position in rapid motion. For the pipe 33 not being subject to torque during the cutting of the slots 89, the shafts 75 of the saws 76 are alternately driven in opposite directions corresponding to the arrows 91, 91' showing the direction of rotation for driving.

After the termination of such a slot cutting process, the pivoting drives 53, 54, 56 are actuated in such a way that the clamping segments 44 of the holding and centering levers 39, 40 and the stop segments 45 of the stop levers release the pipe 33. The clamping segments 44 of the holding and centering and conveying levers 41 remain in engagement with the pipe 33. Now the conveying drive 22 is actuated in such a way that the conveying carriage 15 is displaced by a stroke travel g in the direction of production 11. The stroke travel g results from the number z of the saw blades 80 multiplied by their distance c. Consequently g =z ×c applies. The stroke travel g exceeds the distance h of the external saw blades 80 of the shaft 75, to which h =(z −1) ×c applies. The strict maintenance of this displacement of the conveying carriage 15 by the stroke travel g is attained by adjustable limit stops 92, to which stop absorbers 92a are assigned.

In this position the pivoting drives 53, 54 are again actuated so that the clamping segments 44 of the holding and centering levers 39, 40 again engage with annular impressions 37 of the pipe 33. The pipe 33 is again centered and held. A new slot cutting procees is performed, taking place as above described.

When the socket 35 is finally moved into the pipe guiding socket 31, then the clamping elements 44a of the associated holding and centering levers 39, which grip through window-type openings 93 of the guide face 38, bear from outside against the end of the socket 35.

After slots 89 being cut into the pipe wall 90 even right beside the socket 35, i.e. once the slotting of the pipe 33 has been finished, all the levers 39, 40, 41 are pivoted such that their clamping segments 44 release the pipe 33. The pipe 33 is then removed from the apparatus in the direction of production 11.

In the first cutting process the annular impressions 37 located between the stop segments 45 and the first saw blade 80 facing them are not provided with slots 89. This does not matter because these impressions 37 are in the vicinity of the spigot 34 of the pipe that will take its place in a socket 35 and is thus closed externally, when a plurality of pipes 33 are assembled, it being of no importance whether the socket 35 is integrally molded or whether a plug-on socket is used.

With pipes 33 of different spacing d of the annular impressions 37, the adaption of the position of the holding and centering levers 39 takes place by the modification of the position of the supporting plate 12 by the spacers 14 being interchanged. The adaption of the position of the clamping segments 44 of the holding and centering and conveying levers 41 is effected by corresponding adjustment of the lifting drive 22 by means of the spindle 27. The modification of the position of the stop segments 45, likewise in the direction of the axis 8, takes place by interchanging the stop levers 42, which is shown in dashed lines in FIG. 1. The stop segments 45 thus take a different position in the direction of the axis 8.

The specified apparatus serves to slot pipes not only of circular crosssectional area, but also of non-cross-sectional area. For instance, catch-water foot pipes as known from U.S. Pat. 4,779,651 can be provided with slots. In this case, the arrangement of the saws 76 must be adapted, in particular only a total of four or five saws 76 will be necessary. Also, the arrangement of the levers 39, 40, 41, 42 must be adapted correspondingly.

When the terms "to saw" and "circular sawing blades" 80 and 80' are used, this also covers the term "to mill" and "disk milling cutter". In this regard, there is no difference between circular sawing blades and disk milling cutters.

What is claimed is:

1. A corrugated pipe slot cutting apparatus comprising
   a machine frame (1) with a pipe duct (32a) for a corrugated pipe (33), said corrugated pipe and duct (32a) having a central longitudinal axis (8) and a downstream end,
   a conveying carriage (15);
   a conveying drive (22) being in driving engagement with said conveying carriage (15) for moving said corrugated pipe (33) through said pipe duct (32a) in a direction of production (11),
   a first group of holding and centering levers (39), and a second group of holding and centering levers (40), said first group of holding and centering levers (39) being spaced upstream from said second group of holding and centering levers (40) and said first and said second group of holding and centering levers (39, 40) being mounted on said machine frame (1) and pivotable from a position of engagement with the annular impressions (37) to a position of release of the corrugated pipe (33), and the holding and centering levers of said first group of holding and centering levers (39) and the holding and centering levers of said second group of holding and centering levers (40) enclosing the pipe duct (32a) by more than 180° of circumference of the pipe duct (32a);
   a group of third levers (41) mounted on the conveying carriage (15) to be pivotable from a position of engagement with the annular impressions (37) to a position of release of the corrugated pipe (33), said third levers (41) enclosing the pipe duct (32a) by more than 180° of circumference of the duct (32a);
   clamping segments (44) which are mounted on the holding and centering levers (39, 40) and said third levers (41) and which mesh with annular impressions (37) of the corrugated pipe (33) in the position of engagement of the levers (39 to 41) and which thereby axially and tangentially arrest and center the pipe (33) in relation to the axis (8);
   pivoting drives (53, 54, 55) each provided for driving of one group of said first group of holding and centering levers (39), said second group of holding and centering levers (40), and said third levers (41);
   at least one stop lever (42), which is supported on the conveying carriage (15) to be movable from a position of contact with an annular elevation (36) on the downstream end of the corrugated pipe (33) to a position of release from the corrugated pipe (33) and which in the position of contact adjusts an initial position of the pipe with respect to the direction of the axis (8);
   saws (76) disposed on the machine frame (1) between said first group of holding and centering levers (39) and said second group of holding and centering levers (40) and movable towards and away from, the pipe duct (32a).

2. An apparatus according to claim 1, wherein the saws (76) are disposed on carriages (70a) displaceable lineally towards and away from, the pipe duct (32a).

3. An apparatus according to claim 1 wherein the levers of the first group of holding and centering levers (39), and of the second group of holding and centering levers (40), and said third levers (41), and the at least one stop lever (42) are pivotably drivable by a common pivoting drive (53 to 56).

4. An apparatus according to claim 3 wherein at least one drive of the pivoting drives (53 to 56) and the conveying drive (22) is a linear drive.

5. An apparatus according to claim 4, wherein the at least one linear drive (46 to 49 and 22) is adjustable by means of a spindle drive in the direction of its linear direction of drive.

6. An apparatus according to claim 1 wherein the levers (39, 40, 41) of each group are connected with a pivoting drive ring (46 to 48) which is pivotable about the central longitudinal axis (8) and connected with one of said pivoting drive (53 to 55).

7. An apparatus according to claim 1, wherein the saws (76) each have at least one rotatably drivable circular saw blade (80, 80'), which is lineally displaceable radially to the axis (8).

8. An apparatus according to claim 1 wherein the holding and centering levers of said first group of holding and centering levers (39) are located upstream in the direction of production (11) with regard to said second group of holding and centering levers (40) are provided with elements (44*a*) to rest on a socket (35) united with the corrugated pipe (33).

* * * * *